(12) United States Patent
Rhines et al.

(10) Patent No.: US 9,286,568 B2
(45) Date of Patent: Mar. 15, 2016

(54) BATTERY DRAIN ANALYSIS AND PREDICTION FOR WIRELESS DEVICES

(71) Applicant: Asurion, LLC, Nashville, TN (US)

(72) Inventors: Jeffrey Rhines, San Antonio, TX (US); Cory Adams, San Antonio, TX (US); Glen Tregoning, San Francisco, CA (US); Heather Lee Wilson, San Francisco, CA (US); Michael Ballou, Irvine, CA (US); Christopher Morgan, Nashville, TN (US); Nathanial Beck, San Mateo, CA (US); Richard Reybok, San Mateo, CA (US); Shawn O'Donnell, Long Beach, CA (US); Lindsay Thompson, San Mateo, CA (US)

(73) Assignee: Asurion, LLC, Nashville, TN (US)

(*) Notice: Subject to any disclaimer, the term of this patent is extended or adjusted under 35 U.S.C. 154(b) by 237 days.

(21) Appl. No.: 13/887,232

(22) Filed: May 3, 2013

(65) Prior Publication Data
US 2014/0330764 A1 Nov. 6, 2014

(51) Int. Cl.
*G06N 5/02* (2006.01)
*H04B 1/38* (2015.01)
(Continued)

(52) U.S. Cl.
CPC .............. *G06N 5/02* (2013.01); *G06F 1/3209* (2013.01); *H04B 1/38* (2013.01); *H04W 52/0261* (2013.01); *H01M 2220/30* (2013.01)

(58) Field of Classification Search
None
See application file for complete search history.

(56) References Cited

U.S. PATENT DOCUMENTS

| 6,915,221 B2 | 7/2005 | Pehrsson et al. |
| 8,204,552 B2 | 6/2012 | Hong et al. |
| 8,315,746 B2 | 11/2012 | Cox et al. |

(Continued)

FOREIGN PATENT DOCUMENTS

| EP | 1887815 | 2/2008 |
| EP | 2 009 886 | 11/2011 |

OTHER PUBLICATIONS

Flinn, Extending Mobile Computer Battery Life through Energy-Aware Adaptation CMU-CS-01-171 [online], Dec. 2001 [retrieved on Apr. 29, 2015]. Retrieved from the Internet:<URL:http://www.google.com/url?sa=t&rct=j&q=&esrc=s&source=web&cd=1&cad=rja&uact=8&ved=0CB8QFjAA&url=http%3A%2F%2Fweb.eecs.umich.edu%2F~jflinn%2Fgroup%2Fpapers%2Fthesis.pdf>.*

(Continued)

*Primary Examiner* — Stanley K Hill
*Assistant Examiner* — Nathan Brown, Jr.
(74) *Attorney, Agent, or Firm* — Fish & Richardson P.C.

(57) ABSTRACT

Technologies for wireless device battery analysis and prediction are disclosed. A described technology includes extracting first attributes associated with first applications; collecting data samples from wireless devices that are configured to execute one or more of the first applications, each of the data samples including (i) one or more application identifiers identifying one or more processes executing on a wireless device during a time duration, and (ii) battery drain information associated with the time duration; determining battery usage characteristics of the extracted first attributes based on correlations among a portion of the data samples; extracting second attribute(s) associated with a second application; identifying one or more of the extracted first attributes that correspond respectively to the second attribute(s); and using one or more of the determined battery usage characteristics that correspond respectively to the one or more identified first attributes to determine a battery usage profile for the second application.

23 Claims, 9 Drawing Sheets

(51) Int. Cl.
*G06F 1/32* (2006.01)
*H04W 52/02* (2009.01)

(56) References Cited

U.S. PATENT DOCUMENTS

| | | |
|---|---|---|
| 8,347,386 B2 | 1/2013 | Mahaffey et al. |
| 8,805,764 B1 | 8/2014 | Rhines et al. |
| 2004/0017180 A1 | 1/2004 | Cook |
| 2004/0204174 A1 | 10/2004 | Pehrsson |
| 2009/0182517 A1 | 7/2009 | Gandhi et al. |
| 2011/0111799 A1 | 5/2011 | Kothari et al. |
| 2011/0301890 A1 | 12/2011 | Shirriff et al. |
| 2012/0005490 A1 | 1/2012 | Goraczko et al. |
| 2012/0254634 A1 | 10/2012 | Chakra et al. |
| 2012/0310564 A1 | 12/2012 | Yamamoto |
| 2012/0317432 A1 | 12/2012 | Assad et al. |
| 2012/0322387 A1 | 12/2012 | Nicoara et al. |

OTHER PUBLICATIONS

Oliner, Adam et al., "Carat: Collaborative Energy Diagnosis" http://carat.cs.berkeley.edu/, downloaded Apr. 30, 2018, 8 pages.

Zhao, Xia et al., "A System Context-Aware Approach for Battery Lifetime Prediction in Smart Phones," Proceedings of the 2011 ACM Symposium on Applied Computing, SAC '11, pp. 641-646.

Authorized officer Jeong Rok Yang, International Search Report and Written Opinion in PCT/US2014/036401, mailed Sep. 12, 2014, 10 pages.

Zhang et al., "Accurate Online Power Estimation and Automatic Battery Behavior Based Power Model General for Smartphones," CODES+ISSS '10, Oct. 24-29, 2010, Scottsdale, Arizona, US (2010), 10 pages.

Authorized officer Kihwan Moon, International Preliminary Report on Patentability in PCT/US2014/036401, mailed Nov. 12, 2015, 7 pages.

\* cited by examiner

BATTERY DRAIN ANALYSIS AND PREDICTION FOR WIRELESS DEVICES

FIELD

This patent document generally relates to wireless device battery analysis and prediction.

BACKGROUND

Wireless devices such as cellphones, smartphones, or tablets include a battery to provide a portable source of energy enabling wireless device users to move around freely without being connected to a power supply. Wireless devices can download and install applications such as games, video teleconference utilities, or word processing applications, which have different respective battery usage properties that impact battery life. Further, different device activities and settings, e.g., network usage, camera usage, brightness setting, communication mode, also have different battery usage properties that can impact battery life. Wireless devices can display remaining battery life information, e.g., a number of bars or colored portions displayed within a rectangular area that corresponds to a remaining battery capacity level.

SUMMARY

This document describes, among other things, technologies relating to wireless device battery analysis and prediction. In one aspect, a described technique includes collecting wireless device information including battery drain information relating to a battery of a wireless device; determining, based on the collected wireless device information, a plurality of prediction outcomes corresponding respectively to a plurality of different battery usage prediction models; determining accuracies respectively for the battery usage prediction models; generating weight values respectively for the battery usage prediction models based on the determined accuracies; and generating a battery prediction result for the wireless device based on the prediction outcomes and the generated weight values. Other forms of this aspect may include corresponding systems, apparatus, and computer software encoded on a non-transitory computer readable storage medium.

These and other implementations may include one or more of the following features. The battery usage prediction models can include a static model that is configured to extrapolate a battery usage profile for a new application from data collected for one or more other applications that have been previously measured for battery usage. In some implementations, the battery usage profile is based on an extrapolation of one or more similarities between the new application and the one or more other applications. Collecting the wireless device information can include extracting one or more attributes of a new application. Determining the prediction outcomes can include retrieving from a database, one or more battery usage characteristics for the one or more extracted attributes of the new application; extrapolating a battery usage profile for the new application based on the one or more retrieved battery usage characteristics for the one or more extracted attributes; and producing, within a static model of the battery usage prediction models, a prediction outcome based on the extrapolated battery usage profile. Determining the prediction outcomes can include producing, within a dynamic model of the battery usage prediction models, a prediction outcome based on the battery drain information. In some implementations, the dynamic model is responsive to changes in the battery drain information that are observed via two or more measurements of the battery. Generating the weight values can include setting, for a first duration, a weight value for the static model higher than weight values for the one or more dynamic models in response to a detection of the new application executing on the wireless device; and setting, for a second duration, the weight value for the static model based on the relative performance of the static model with respect to the one or more dynamic models, the second duration being subsequent to the first duration. Implementations can include determining an estimated time to a depleted state of the battery based on the battery prediction result. Implementations can include sending a battery measurement sample to a server, the battery measurement sample including one or more process identifiers of processes executing on the wireless device; and receiving from the server battery prediction information corresponding to the one or more process identifiers. Determining the prediction outcomes can include using the battery prediction information.

In another aspect, a technique for battery analysis and prediction includes extracting first attributes associated with a plurality of first applications; collecting data samples from a plurality of wireless devices that are configured to execute one or more of the first applications, each of the data samples including (i) one or more application identifiers identifying one or more processes executing on a wireless device during a time duration, and (ii) battery drain information associated with the time duration; determining battery usage characteristics of the extracted first attributes based on correlations among at least a portion of the data samples; extracting one or more second attributes associated with a second application; identifying one or more of the extracted first attributes that correspond respectively to the extracted second attributes; and using one or more of the determined battery usage characteristics that correspond respectively to the identified first attributes to determine a battery usage profile for the second application. Other forms of this aspect include corresponding systems, apparatus, and computer software encoded on a non-transitory computer readable storage medium.

These and other implementations may include one or more of the following features. Determining the battery usage characteristics comprises generating statistical coefficients for the extracted first attributes. In some implementations, the battery usage profile for the second application is based on one or more of the statistical coefficients. In some implementations, the battery usage profile includes a predicted battery drain rate. Implementations can include receiving an identifier associated with the second application from a wireless device; and providing, based on the received identifier, the battery usage profile to the wireless device.

In another aspect, a system for battery analysis and prediction can include a storage device and a processor, where the storage device can be configured to store wireless device information including battery drain information relating to a battery of a wireless device. The processor can be communicatively coupled with the storage device, and can be configured to (i) determine, based on the wireless device information, a plurality of prediction outcomes corresponding respectively to a plurality of different battery usage prediction models, (ii) determine accuracies respectively for the battery usage prediction models, (iii) generate weight values respectively for the battery usage prediction models based on the accuracies, and (iv) generate a battery prediction result for the wireless device based on the prediction outcomes and the weight values. In some implementations, the system includes a server that includes the process and the storage device.

In another aspect, a system for battery analysis and prediction can include a storage device and a processor, where the storage device can be configured to store data samples from a plurality of wireless devices that are configured to execute one or more of a plurality of first applications, each of the data samples including (i) one or more application identifiers identifying one or more processes executing on a wireless device during a time duration, and (ii) battery drain information associated with the time duration. The processor can be communicatively coupled with the storage device, and can be configured to extract first attributes associated with the plurality of first applications, (ii) determine battery usage characteristics of the first attributes based on correlations among at least a portion of the data samples, (iii) extract one or more second attributes associated with a second application, (iv) identify one or more of the first attributes that correspond respectively to the second attributes as identified first attributes, and (v) use one or more of the battery usage characteristics that correspond respectively to the identified first attributes to determine a battery usage profile for the second application.

Particular configurations of the technology described in this document can be implemented so as to realize one or more of the following potential advantages. A described technology can be used to combine prediction outcomes in a way that provides smoother prediction results over time for display on a wireless device. A described technology can be used to score a new application in terms of battery usage without having to directly measure battery usage of a new application. A described technology can be used to increase overall accuracy of a battery life prediction.

Details of one or more implementations of the subject matter described in this document are set forth in the accompanying drawings and the description below. Other features, aspects, and potential advantages of the subject matter will become apparent from the description, the drawings, and the claims.

BRIEF DESCRIPTION OF THE DRAWINGS

Like reference symbols in the various drawings indicate like elements.

DETAILED DESCRIPTION

With increasing demands placed on a wireless device's battery, wireless service providers can provide mechanisms for analyzing an application's battery usage and predicting battery life to manage energy consumption. Such mechanisms can identify applications executing on a device, and characterize their battery depletion rate with respect to other applications in the general application population, e.g., high, medium, or low battery drain rates. Further, such mechanisms can estimate when a wireless device will power down based on an estimated battery depletion rate, and provide guidance to device users to prolong battery life.

Figure 1:
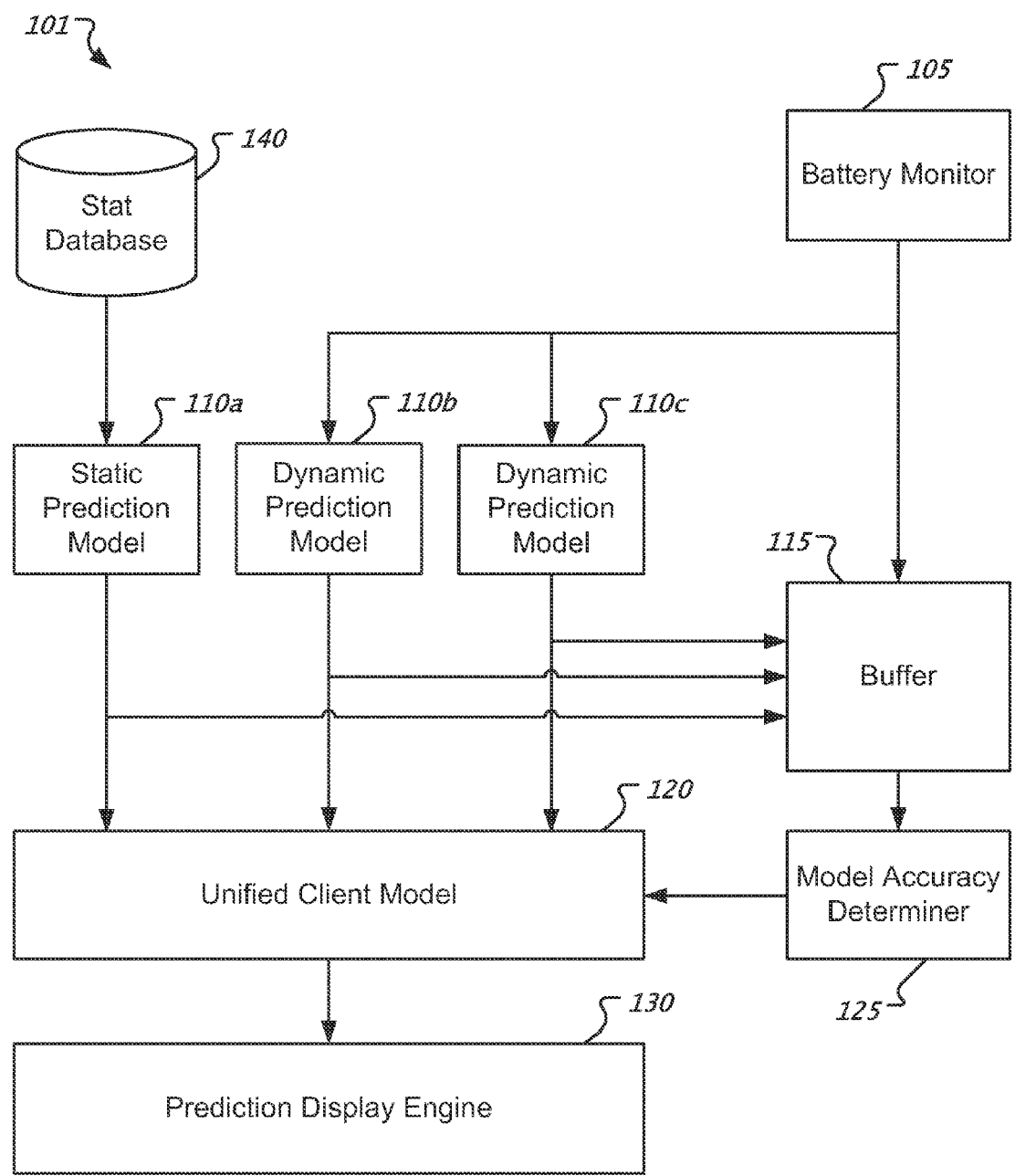
FIG. 1 shows a diagram of an example of a battery life prediction architecture.

FIG. 1 shows a diagram of an example of a battery life prediction architecture 101. The battery life prediction architecture 101 can be implemented in part or in whole by one or more data processing apparatuses such as a wireless device or a server. For example, a wireless device can use multiple prediction models 110a-c to determine an estimated battery depletion rate. Further, a unified client model 120, within the architecture 101, can combine prediction outputs from the multiple prediction models 110a-c to form a battery prediction result. The prediction models can include one or more static prediction models 110a, one or more dynamic prediction models 110b-c, or a combination thereof. The dynamic prediction models 110b-c can base their prediction outputs on one or more sources such as outputs from a battery monitor 105, process list, device resource usage, statistical coefficients, or a combination thereof. The battery monitor 105 can be configured to monitor a battery of a wireless device.

A static prediction model 110a can base its prediction outputs on one or more sources such as a process list or a statistical database 140. The statistical database 140 can store information such as relationships between application attributes and corresponding battery usage information that have been inferred by analyzing battery drain rates for multiple applications. The static prediction model 110a can use information from the statistical database 140 to extrapolate battery usage for "new" applications, e.g., applications that have not yet been analyzed using their own battery drain rate observations. In some implementations, one or more components of the battery life prediction architecture 101 can be implemented by a data processing apparatus such as a server. For example, a server can host the statistical database 140. In some implementations, a server can compute prediction model outputs based on battery monitor values received from a wireless device.

A model accuracy determiner 125 can generate weight values for the prediction models 110a-c, respectively. A weight value can be based on, for example, an accuracy of a model. In some implementations, a weight value can be expressed as a fractional value, where a higher fractional value indicates a more accurate model. In some implementations, a weight value for a model can be based on a moving average of error values for the model. In some implementations, weight values can be initialized to a default value such as 1/N, where N is the number of models feeding into the unified client model 120. The model accuracy determiner 125 can generate an error value by comparing a prediction value from a model with a corresponding value from the battery monitor 105. The model accuracy determiner 125 can use a buffer 115 to synchronize prediction values and battery monitor values in time. A prediction display engine 130 can receive a battery prediction result from the unified client model 120 and generate information to display on a wireless device such as a predicted battery depletion time frame.

Figure 2:
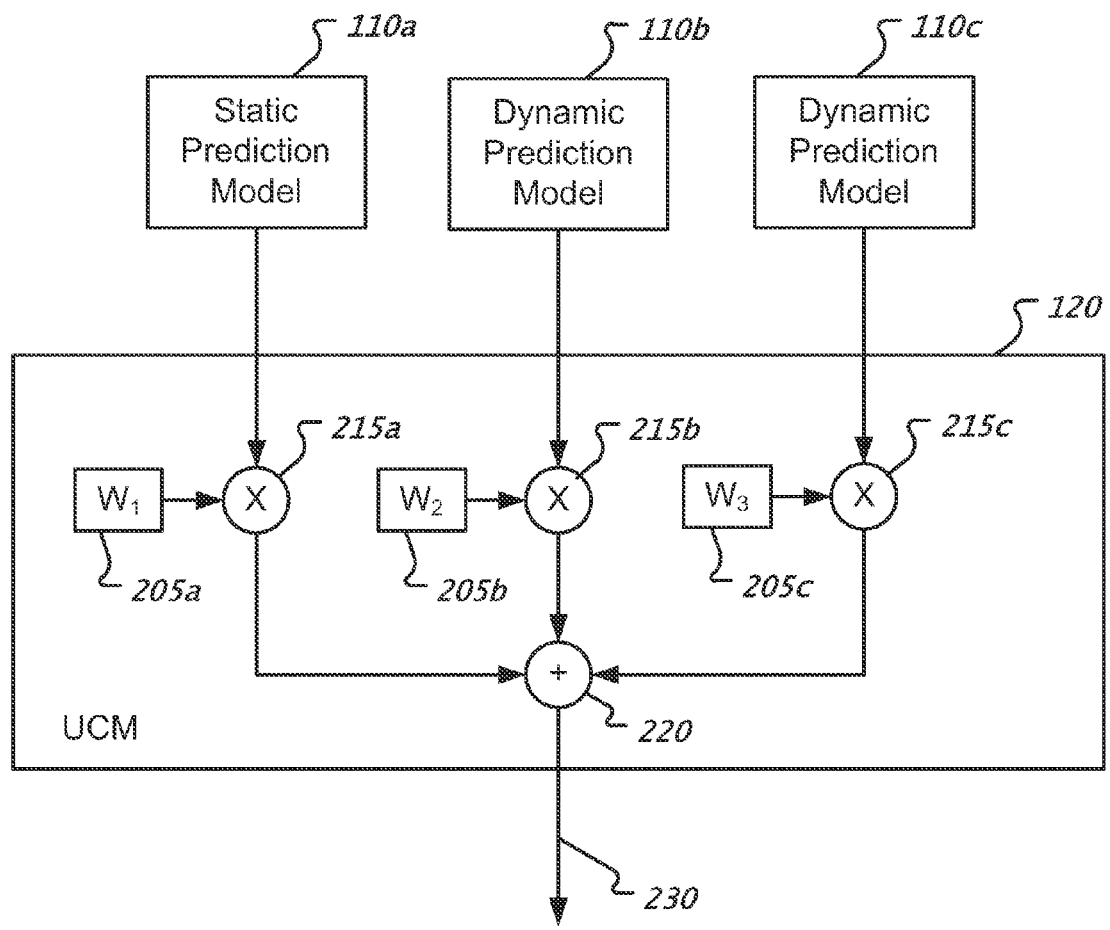
FIG. 2 shows a diagram of an example of a unified client model.

FIG. 2 shows a diagram of an example of a unified client model 120. The unified client model 120 can use multiplier units 215a-c to multiply weight values 205a-c and respective prediction output values. The weight values 205a-c can be generated via the model accuracy determiner 125 of FIG. 1. The prediction output values can be generated via respective prediction models 110a-c. A summation unit 220 can sum the outputs from the multiplier units 215a-c to form a battery prediction result 230.

Figure 3:
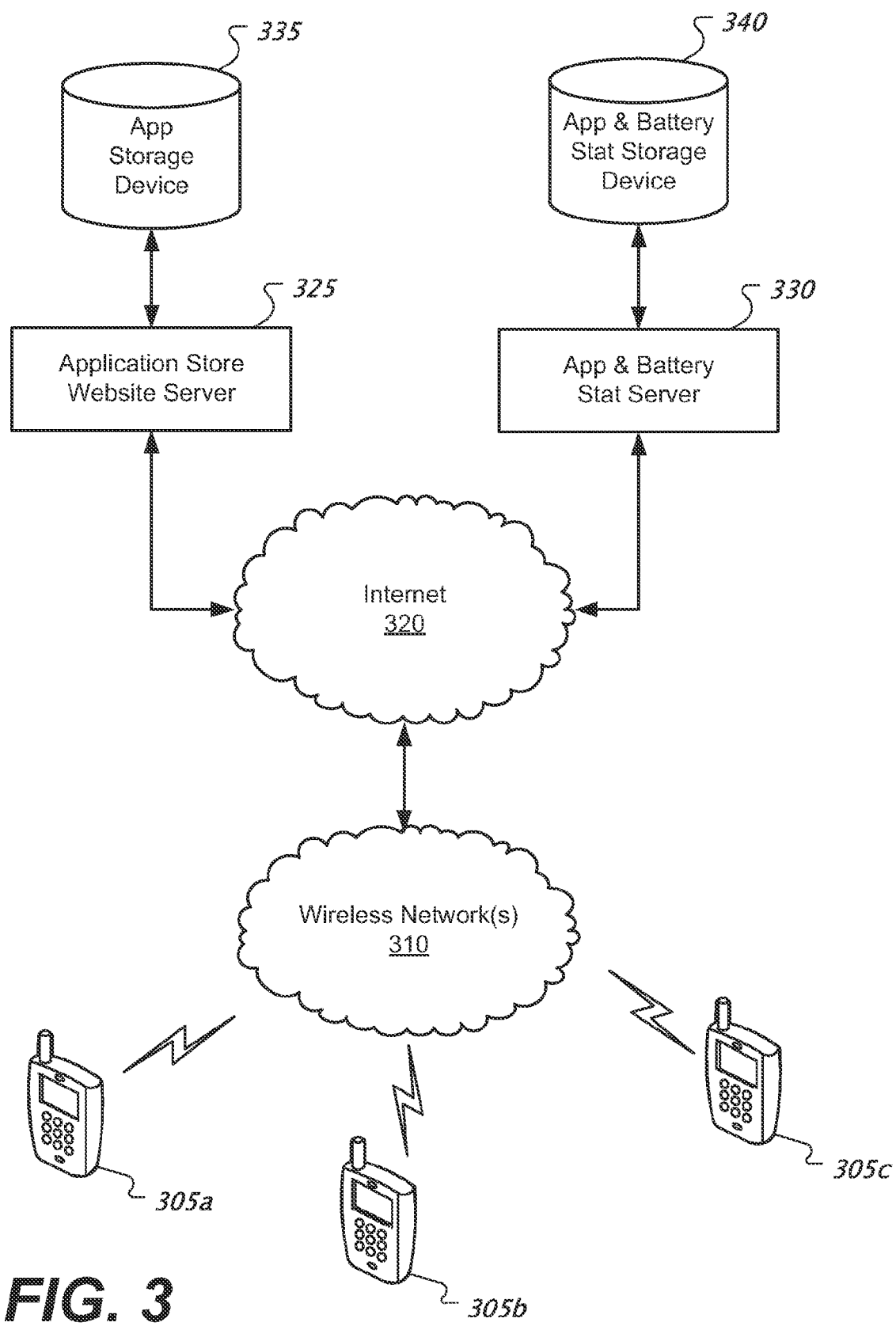
FIG. 3 shows a diagram of an example of a simplified network architecture.

FIG. 3 shows a diagram of an example of a simplified network architecture. Wireless devices 305a-c can communicate via one or more wireless networks 310 to reach servers 325, 330 on the Internet 320. For example, wireless device 305a-c can communicate with an application store website server 325 to download applications. The application store website server 325 can include a storage device 335 that stores applications. The wireless devices 305a-c can be configured with a battery life prediction application that is configured to communicate with an application and battery statistical server 330. For example, the wireless devices 305a-c can provide battery usage information about one or more applications to the statistical server 330. Further, the statistical server 330 can compile statistical information about applications and associated battery usage and provide such information to the wireless devices 305a-c. The statistical server 330 can include a storage device 340 that stores application and battery statistical information. In some implementations, the storage device 340 includes one or more non-volatile memory devices such as a hard disk drive. In some implementations, the storage device 340 includes one or more volatile memory devices such as a random access memory (RAM). In some implementations, a server 325, 330 can include multiple server blades that are geographical distributed. In some implementations, a server 325, 330 can include a processor that can contain multiple processor cores.

Figure 4:
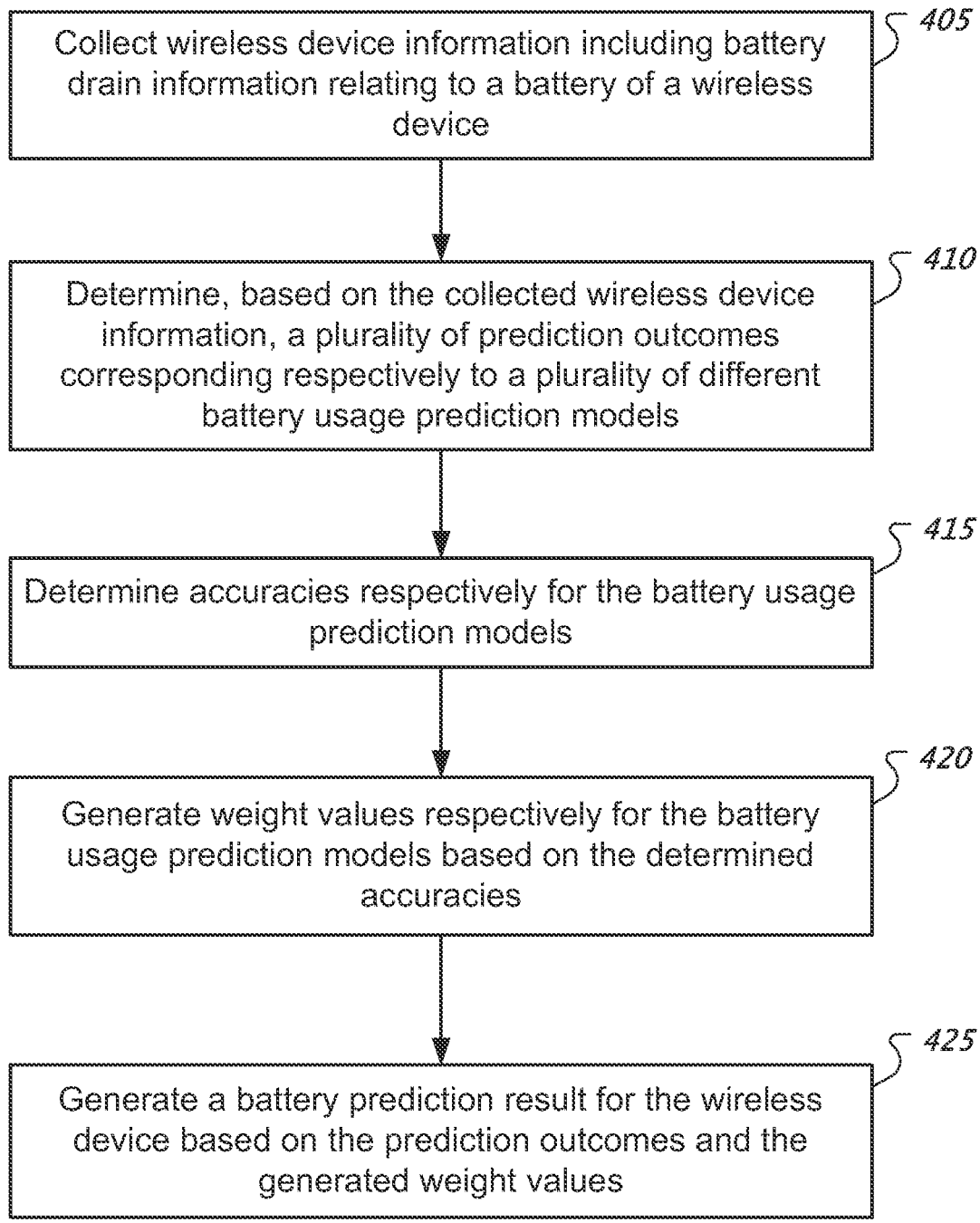
FIG. 4 shows a flowchart of an example of a process that uses multiple battery prediction models.

FIG. 4 shows a flowchart of an example of a process that uses multiple battery prediction models. At 405, the process collects wireless device information including battery drain information relating to a battery of a wireless device. In some implementations, battery drain information can include a battery drain rate. In some implementations, battery drain information can include first and second battery capacity levels for first and second data points, and a time delta between the first and second data points. Collecting wireless device information can include identifying one or more processes executing on the wireless device.

At 410, the process determines, based on the collected wireless device information, a plurality of prediction outcomes corresponding respectively to a plurality of different battery usage prediction models. The battery usage prediction models can include a static model and a dynamic model. In some implementations, a static model can be configured to extrapolate a battery usage profile for a new application from data collected for one or more other applications that have been previously measured for battery usage. In some implementations, a battery usage profile for a new application is based on an extrapolation of one or more similarities between the new application and the one or more other applications. Collecting the wireless device information, at 405, can include extracting one or more attributes of the new application. Determining the prediction outcomes, at 410, can include retrieving from a database, one or more battery usage characteristics for the one or more extracted attributes of the new application, extrapolating a battery usage profile for the new application based on the one or more retrieved battery usage characteristics for the one or more extracted attributes; and producing, within a static model of the battery usage prediction models, a prediction outcome based on the extrapolated battery usage profile. Determining the prediction outcomes, at 410, can include producing, within a dynamic model of the battery usage prediction models, a prediction outcome based on the battery drain information. The dynamic model can be responsive to changes in the battery drain information that are observed via two or more measurements of the battery.

At 415, the process determines accuracies respectively for the battery usage prediction models. Determining accuracies can include comparing a predicted value for a duration with an observed value for that duration. At 420, the process generates weight values respectively for the battery usage prediction models based on the determined accuracies. At 425, the process generates a battery prediction result for the wireless device based on the prediction outcomes and the generated weight values. Generating a battery prediction result can include combining the weighted versions of the prediction outcomes. The process can include determining an estimated time to a depleted state of the battery based on the battery prediction result.

In some implementations, generating the weight values, at 420, can include setting, for a first duration, a weight value for the static model higher than weight values for the one or more dynamic models in response to a detection of the new application executing on the wireless device. Generating the weight values, at 420, can include setting, for a second, subsequent duration, the weight value for the static model based on the relative performance of the static model with respect to a dynamic model.

Figure 5:
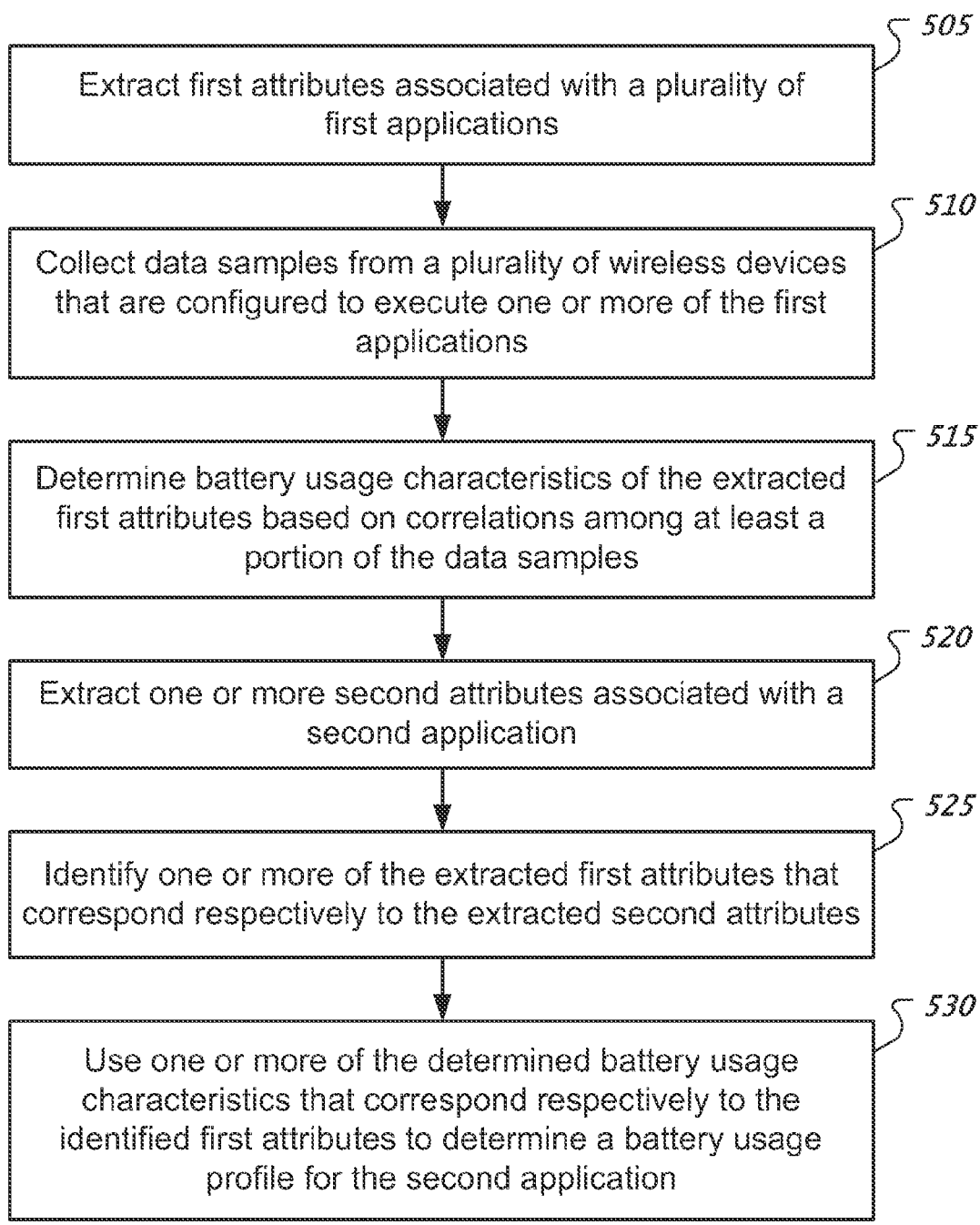
FIG. 5 shows a flowchart of an example of a process to generate data for a static prediction model.

FIG. 5 shows a flowchart of an example of a process to generate data for a static prediction model. At 505, the process extracts first attributes associated with a plurality of first applications. Extracting attributes can include determining whether a particular device resource (e.g., audio, graphical render, decoder, network, sensor, or Bluetooth) is used by an application, and, if used, assigning an attribute to the application within an application attribute database. For example, if an application links to a graphical render library, then the process can assign a graphical render attribute to the application.

At 510, the process collects data samples such as battery measurement samples from a plurality of wireless devices that are configured to execute one or more of the first applications. A data sample can include one or more application identifiers identifying one or more processes executing on a wireless device during a time duration, and battery drain information associated with the time duration. In some implementations, a data sample includes a process identification string, and the process extracts an application identifier from the string. In some implementations, a battery drain rate is derived from two or more data samples that each contain a battery capacity level value. In some implementations, a data sample includes a battery drain rate.

At 515, the process determines battery usage characteristics of the extracted first attributes based on correlations among at least a portion of the data samples. Determining the battery usage characteristics can include performing a statistical analysis such as a multiple linear regression (MLR) analysis, hierarchical clustering analysis, or principle component analysis (PCA). Other types of statistical analysis are possible.

At 520, the process extracts one or more second attributes associated with a second application. Unlike the first applications, the second application has typically not been observed yet for battery usage. At 525, the process identifies one or more of the extracted first attributes that correspond respectively to the extracted second attributes. At 530, the process uses one or more of the determined battery usage characteristics that correspond respectively to the identified first attributes to determine a battery usage profile for the second application. A battery usage characteristic can include a battery drain rate. In some implementations, a battery usage characteristic includes one or more coefficients that are generated by a statistical analysis.

In some implementations, determining the battery usage characteristics, at 515, can include generating statistical coefficients for the extracted first attributes. In some implementations, a battery usage profile for the second application is based on one or more of the statistical coefficients. In some implementations, a battery usage profile can include a score indicating a relative degree of battery consumption relative to other applications. In some implementations, a battery usage profile includes a predicted battery drain rate.

Figure 6A:
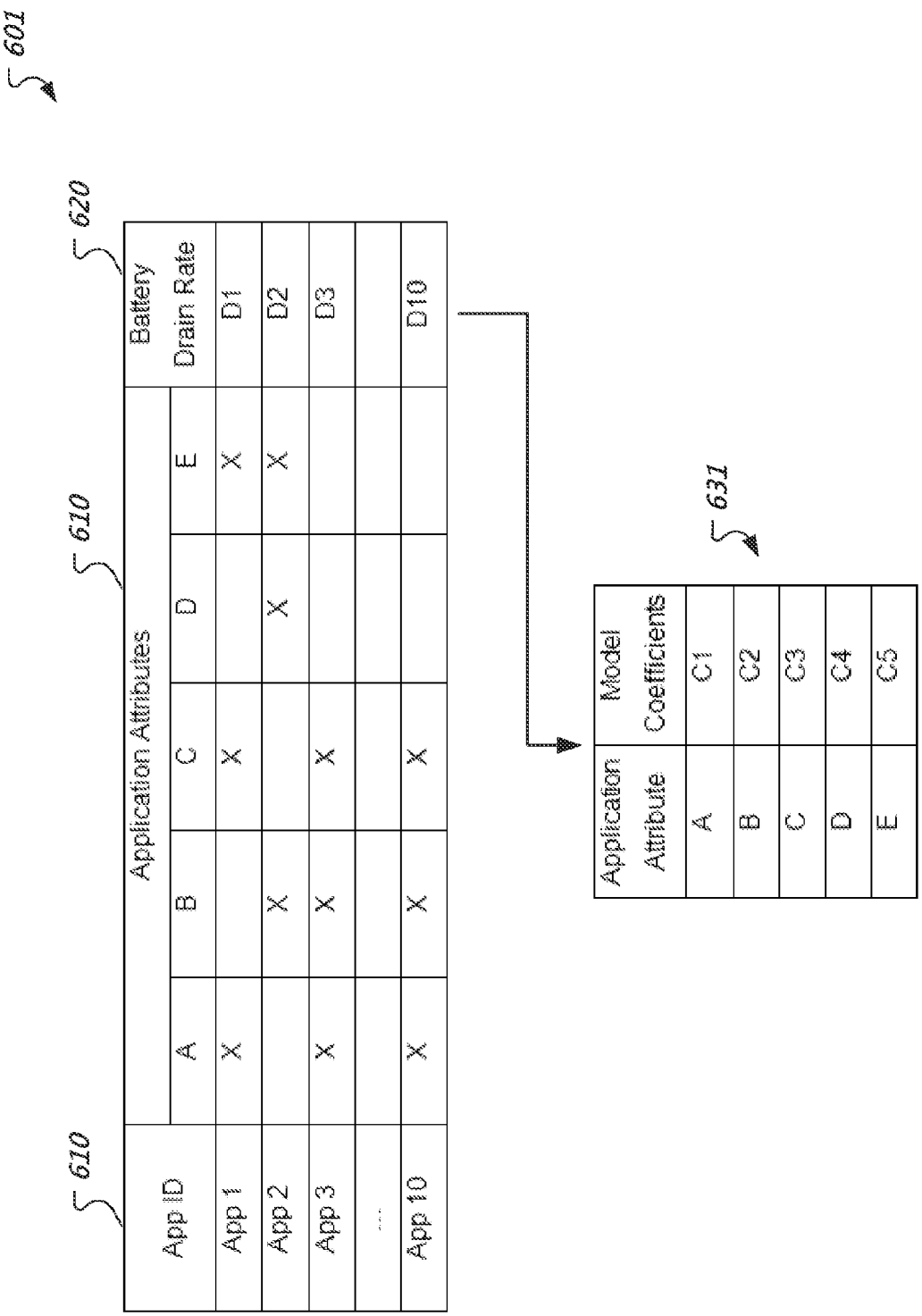
FIG. 6A shows an example of an application chart including application identifiers with associated application attributes, and associated battery drain rates based on data samples and an example of a model coefficient chart including associated model coefficients.

FIG. 6A shows an example of an application chart 601 including application identifiers with associated application attributes, and associated battery drain rates based on data samples and an example of a model coefficient chart 631 including associated model coefficients. The application chart 601 includes a column 610 for application identifiers, multiple columns 610 for respective application attributes (labeled A-E), and a column 620 for battery drain rates for the applications. A statistical analysis process can use one or more observations, e.g., battery measurement samples, to correlate application attributes with respective contributions to a battery drain rate to produce model coefficients, which are depicted by the model coefficient chart 631. In some implementations, battery drain rates for each application in the application chart 601 can be individually observed. In some implementations, the battery drain rates for each application are determined via statistical analysis based on joint observations, e.g., a drain rate was measured when two or more applications were executing during a measurement period. Further, battery drain rates for each application can be based on data collected from multiple phones.

Figure 6B:
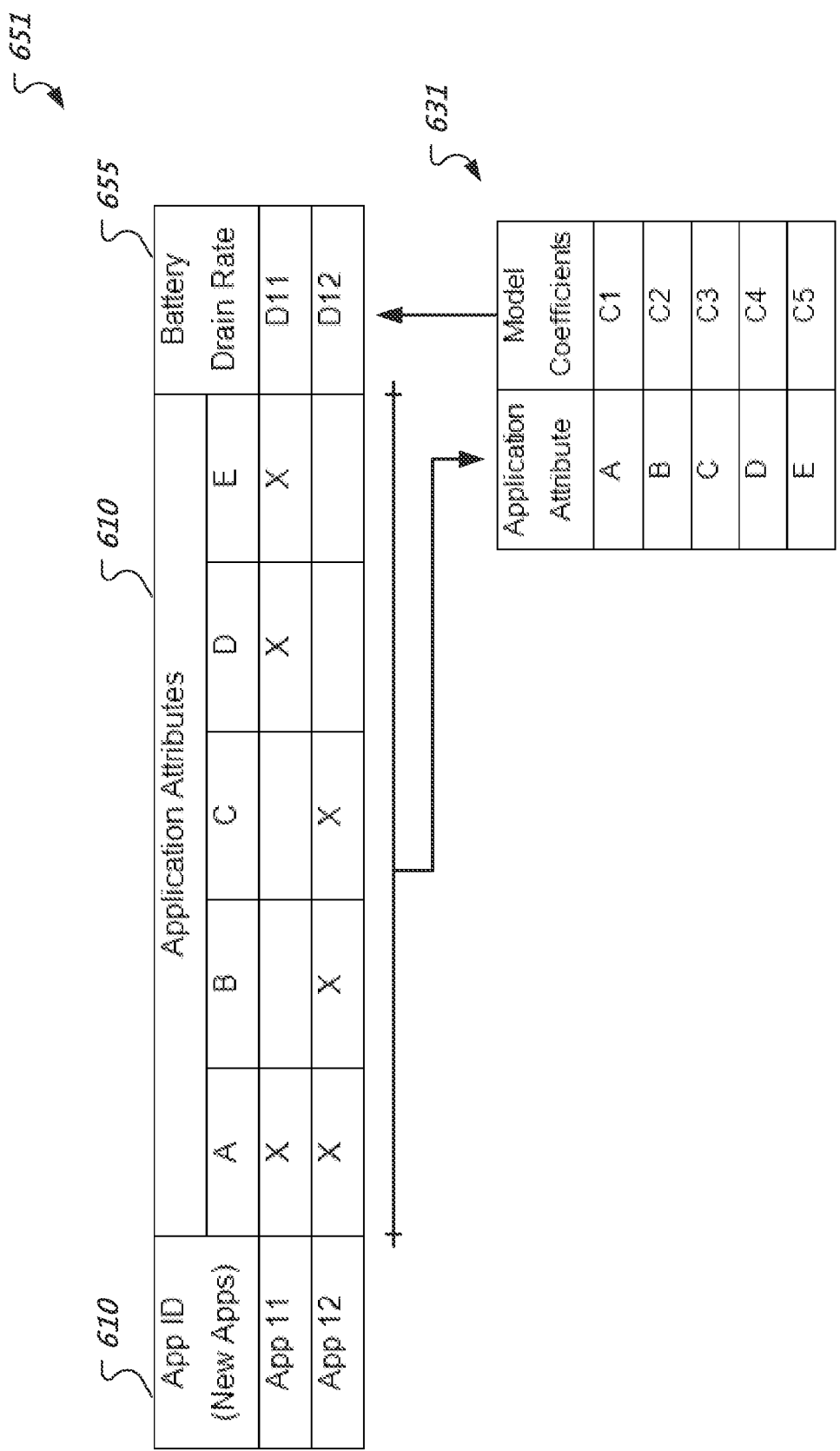
FIG. 6B shows an example of an application chart including application identifiers with associated application attributes, and associated battery drain rates based on extrapolations from data in the model coefficient chart of FIG. 6A.

FIG. 6B shows an example of an application chart 651 including application identifiers with associated application attributes, and associated battery drain rates based on extrapolations from data in the model coefficient chart 631 of FIG. 6A. The application chart 651 includes a column 610 for application identifiers, multiple columns 610 for respective application attributes (labeled A-E), and a column 655 for battery drain rates for the applications that are based on extrapolations. For example, the model coefficient chart 631 can be used to extrapolate battery drain rates for applications that have not been observed yet. Thus, based on extracted application attributes for a new application, their respective coefficients from chart 631 can be retrieved, and a battery drain rate for the new application can be extrapolated.

Figure 7:
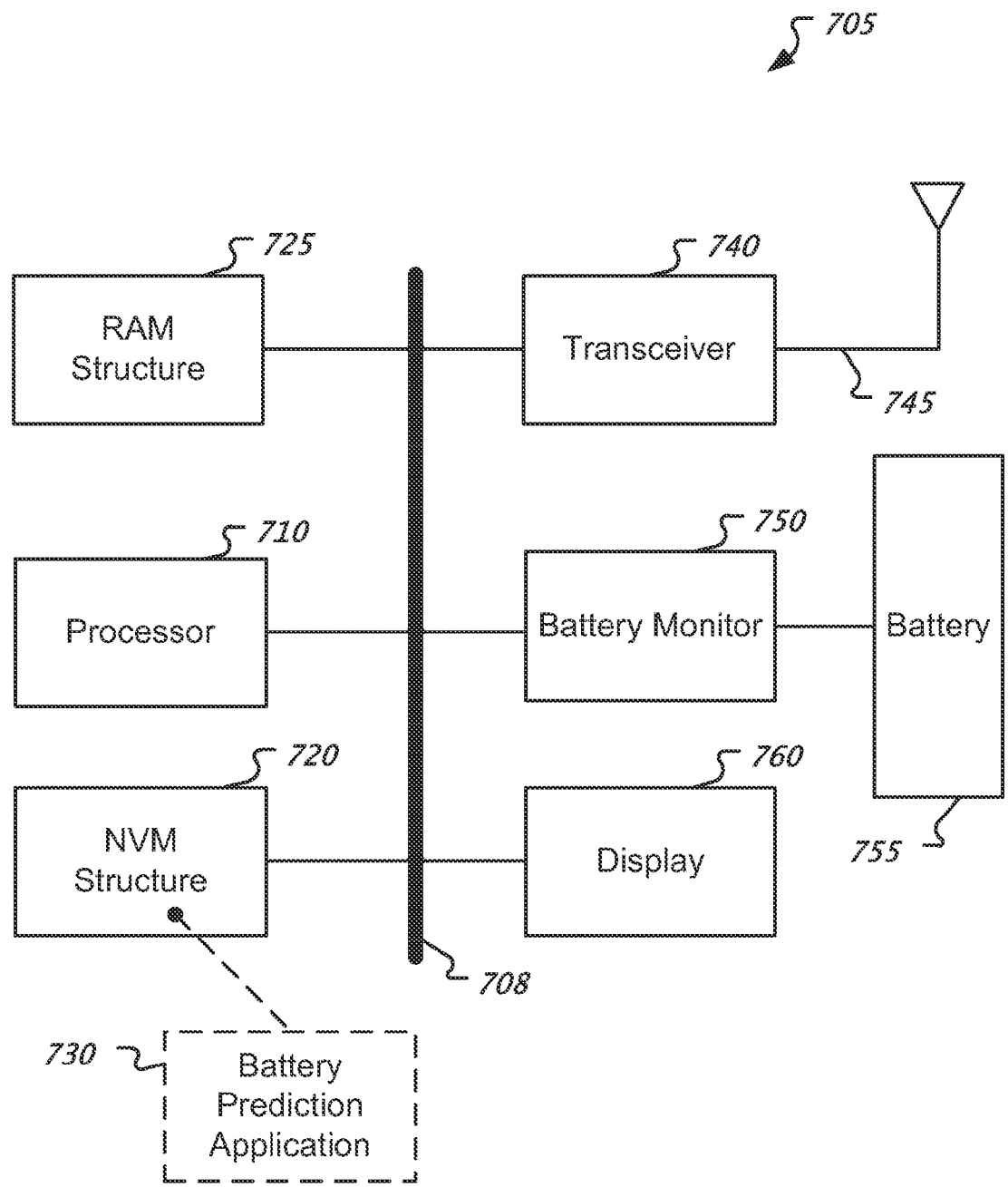
FIG. 7 shows a simplified architecture of an example of a wireless device that is configured to store a battery prediction application.

FIG. 7 shows a simplified architecture of an example of a wireless device 705 that is configured to store a battery prediction application 730. The wireless device 705 includes a processor 710, non-volatile memory (NVM) structure 720, random-access memory (RAM) structure 725, display 760, transceiver 740, antenna 745, battery 755, and a batter monitor 750. The device 705 can include other components not shown such as a keyboard, camera, and motion sensors. A bus 708 can interconnect components within the wireless device 705.

The wireless device 705 can send and receive data packets over one or more wireless interfaces. For example, the wireless device's processor 710 can send and receive data packets via one or more transceivers 740 and antennas 745. Various examples of wireless interface technology include interfaces based on Long Term Evolution (LTE), Global System for Mobile Communications (GSM), IEEE 802.11a/b/g/n/ac, and Code Division Multiple Access (CDMA) technologies such as CDMA2000 and WCDMA. Other types of wireless interface technologies are possible. The wireless device 705 can download application software over one or more of these wireless interfaces and store the application software on a memory structure such as the NVM structure 720 or the RAM structure 725.

The NVM structure 720 stores software such as a wireless device OS and application software such as a battery prediction application 730. The processor 710 can load software from the NVM structure 720 into the RAM structure 725, and can start to execute the software from the RAM structure 725. In some implementations, the processor 710 directly executes software from the NVM structure 720. In some implementations, the processor 710 includes multiple processor cores.

The battery prediction application 730 can receive data from the battery monitor 750 about the battery 755. Such data can include a voltage value, battery capacity level value, temperature value, charging state (e.g., charging or discharging), or a combination thereof. In some implementations, the battery monitor 750 includes a digital voltage meter, a digital ammeter, a temperature sensor, or a combination thereof. In some implementations, the wireless device 705 can download the battery prediction application 730 from an application store via the transceiver 740 and install it on the NVM structure 720. In some implementations, the battery prediction application 730 is pre-installed on the device 705. In some implementations, the device 705 sends a battery measurement sample to a server, the battery measurement sample including one or more process identifiers of processes executing on the wireless device and data collected from the battery monitor 750. In some implementations, the device 705 can be configured to receive, from the server, battery prediction information corresponding to one or more process identifiers within a battery measurement sample. The device 705 can use, among other things, the battery prediction information to form battery prediction results that can be displayed on the display 760 of the device 705.

Figure 8:
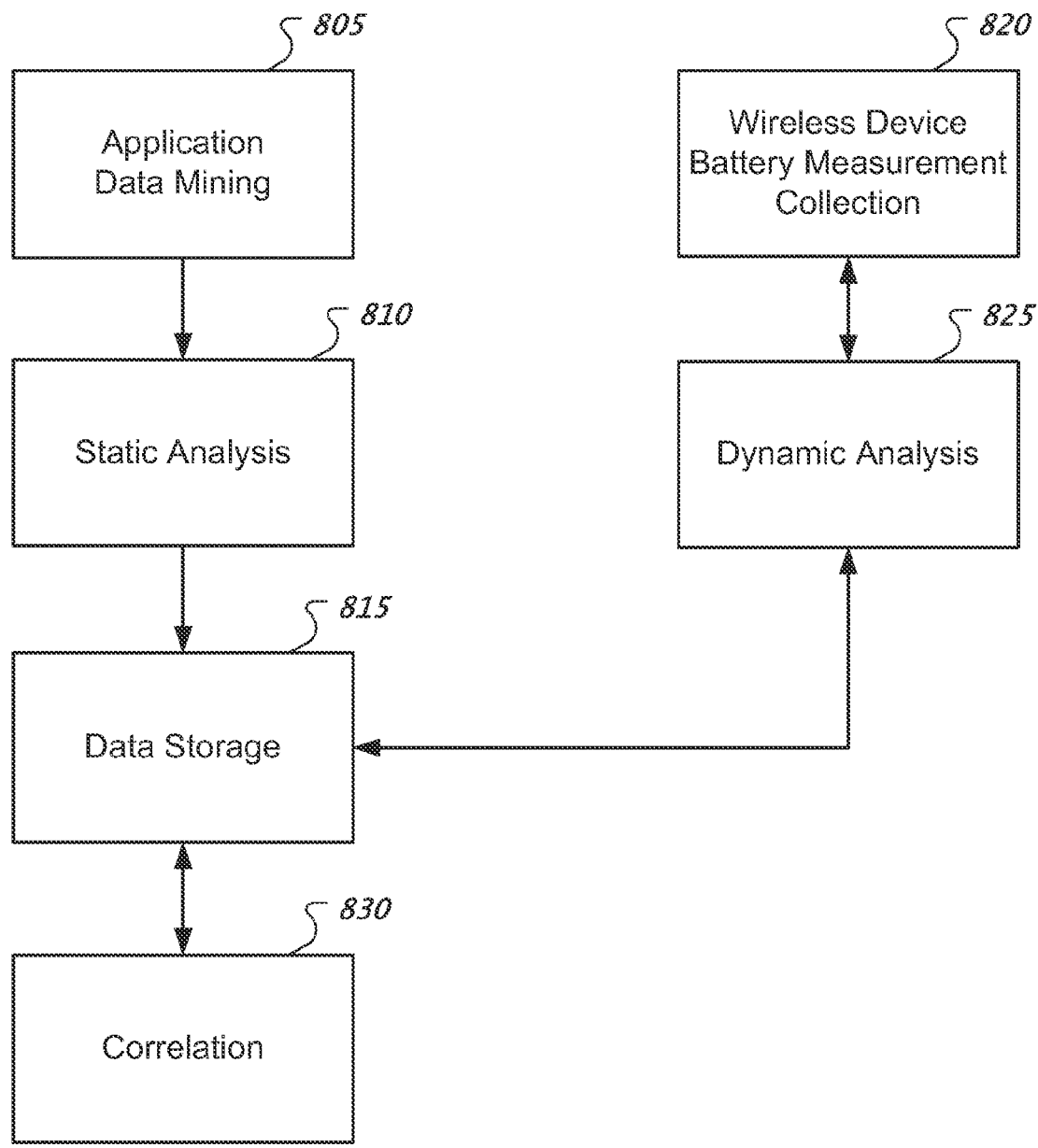
FIG. 8 shows a flowchart of an example of an inter-process architecture for battery analysis and prediction.

FIG. 8 shows a flowchart of an example of an inter-process architecture for battery analysis and prediction. The inter-process architecture can include an application data mining process 805, device battery measurement collection process 820, static analysis process 810, dynamic analysis process 825, and a data storage process 815. The application data mining process 805 can include obtaining application packages. An application package can include one or more of source code files, executable files, installation instructions for an automated installer, or metadata files.

The static analysis process 810 can include extracting application attributes from an application package. In some implementations, extracting application attributes can include determining whether a particular library is used by the application, and, if used, assigning an attribute. For example, if an application links to a networking library, then the process 810 can assign a network usage attribute to the application. Various examples of application attributes include user interface background mode types (e.g., audio, location, VoIP, network, Bluetooth), gyroscope usage, accelerometer usage, network usage, location usage, intense graphics rendering (e.g., use of a 3D graphical rendering engine), and streaming audio usage. Additional examples of application attributes include number of frameworks, framework identifiers, an application programming interface (API) list, a number of APIs, linked libraries, service handlers, and permissions. Other types of application attributes are possible. In some implementations, the data storage process 815 receives and stores application identifiers and associated application attributes that are sent by the static analysis process 810.

A wireless device battery measurement collection process 820 can receive battery measurement samples from wireless devices. Such battery measurement samples can include a battery drain rate data for a measurement period, and a list of process identifiers corresponding to processes that were active during the measurement period. The collection process 820 can exclude measurements taken during a device charging state, e.g., device is plugged into an electrical outlet. In some implementations, battery measurement samples can include a battery level (e.g., current battery capacity level as a percentage of the total capacity), timestamp, one or more process identifiers, device identifier (e.g., electronic serial number (ESN) or an International Mobile Station Equipment Identity (IMEI)), and/or a device maker-model string. In some implementations, the data storage process 815 receives and stores battery measurement samples that are forwarded from the collection process 820 via the dynamic analysis process 825.

The correlation process 830 can retrieve information such as application identifiers, application attributes, and battery measurement samples from the data storage process 815. The correlation process 830 can use a statistical analysis technique such as a MLR model to determine which attributes are statistically significant and apply the resulting coefficients output from the MLR model as a score for each attribute. In some implementations, the correlation process 830 can use a statistical analysis technique such as PCA or k-means clustering to determine which attributes are statistically significant. The correlation process 830 can be executed on a periodic basis (e.g., hourly, daily, or weekly) to update the coefficients based on additional samples, new applications, or both.

The correlation process 830 can extract a list of process identifiers from a battery measurement sample. The correlation process 830 can query a database (e.g., such as a database stored within storage device 340 of FIG. 3) to find matching process names that have been scored statically and identify attributes for each process. In some implementations, the process 830 retrieves an attribute vector for each application identified by a process identifier within a sample, where each element of the attribute vector represents a different attribute. In some implementations, elements can be a 1 or a 0, where a 1-valued element indicates that an attribute is associated with an application, and a 0-valued element indicates that an attribute is not associated with the application. The correlation process 830 can generate an aggregated attribute vector for the sample. In some implementations, an aggregated attribute vector is a summation of all retrieved vectors for a sample. In some implementations, an aggregated attribute vector is a result of performing an element-wise logical OR operation of all of the retrieved vectors for a sample. Such an aggregated attribute vector can form the independent variables within a MLR model. In some cases, one or more processes identified within a measurement sample may not have been scored by the correlation process 830. In such cases, the value of the dependent variable can be adjusted based on (i) the percentage of applications statically scored within the sample and (ii) the change in battery capacity level given by the sample divided by the time period duration. The independent and dependent variables are then input into a MLR model such as:

$$Y_i = \beta_0 + \beta_1 x_{i,1} + \beta_2 x_{i,2} + \ldots + \beta_k x_{i,k} + \epsilon_i,$$

where $\beta_k$ represents the k-th model coefficient, $x_{i,k}$ represents the k-th element of an aggregated attribute vector for an i-th observation, and $\epsilon_i$ represents an error term. The MLR model can be used to determine which attributes are statistically significant. Attributes that are deemed statistically significant can then be input into the MLR model again to provide the coefficients or weights for each of the attributes. In some implementations, an attribute is determined to be statistically significant and added to the second MLR iteration if an associated P value is less than 5%, e.g., having a confidence interval of greater than 95%.

The determined coefficients can be used to score applications that are stored via the data storage process 815. In some implementations, if an application attribute was not found to be statistically significant then the weight will be set to 0 for that attribute. Iterating through each application stored via the data storage process 815, the correlation process 830 can produce a static score sum for an application by summing together coefficients that correspond to application attributes that are present in the application. In some implementations, a percentile score can be computed for an application based on the static score sum relative to an entire population score. Score data can be provided to a wireless device for on-device battery life prediction. A static score sum can be used to predict battery life. A percentile score can be used to indicate a degree of relative battery usage. For example, percentile scores can be grouped into categories and assigned labels such as high, medium, low ranges, which can be display to a user of a wireless device.

A dynamic analysis process 825 can receive battery measurement samples from the collection process 820 and perform one or more real-time analyses. In some implementations, the dynamic analysis process 825 can measures battery depletion across a population of wireless devices to determine whether an application tends to consume more, less, or the same power as other apps in the population. In some implementations, dynamic analysis process 825 can send prediction information to a wireless device. The prediction information, for example, can be formulated based on the list of process identifiers within a battery measurement sample. The prediction information can include one or more sets of information, each set include a process identifier, mean battery depletion rate of the corresponding application, a rank value (e.g., percentile of mean as compared to other applications, diff value (e.g., percentage difference of the mean of this application compared to the overall mean), and statistical model values such as a P value of a t-statistic. In some implementations, the dynamic analysis process 825 includes a service that responses to a battery measurement sample from a device by extracting process identifiers, obtaining pre-calculated statistical information, such as weights or scores, about the corresponding applications, and sending the pre-calculated statistical information to the device. The device can use the pre-calculated statistical information to enhance battery depletion rate predictions.

In some implementations, the correlation process 830 can perform statistical analysis on observed client battery depletion data points and their relation to application attributes. The correlation process 830 can collate, reduce, and compile measurements into usable battery depletion events, calculate the battery depletion rate observed while each app was loaded into memory, and use previously extracted information about the application to extrapolated a rate that may be observed for other apps. In some implementations, the correlation process 830 can detect battery depletion events based on the measurements. In some implementations, the correlation process 830 retrieves measurements from the data storage process 815 ordered by device identifier and timestamp of submission. Each measurement can be compared to a previous measurement. For example, if the battery level has increased for the same device identifier, the measurement can be skipped since the device's battery was most likely recharged during the measurement period. Battery depletion events can be defined by two consecutive measurements on the same device between which the battery level has not risen. Each battery depletion event can have a battery depletion percentage and an elapsed time. A depletion rate can be calculated by dividing the battery depletion over the elapsed time. Once the rate is determined, the correlation process 830 can use a configuration file of known system process names to remove system processes from a measurement's process identifier list to produce a list of processes that correspond to user-controllable applications. The battery depletion rate for that event is then divided by the number of remaining apps to produce a reduced rate, the reduced rate can be associated with the remaining applications. In some implementations, the correlation process 830 can use extracted application attributes as independent variables in a MLR model, with the observed battery depletion rates serving as the dependent variable. The resulting coefficients can be used to extrapolate a battery depletion rate for an application that has not yet been observed on a user's device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for detecting impersonation on a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method implemented by data processing apparatus, the method comprising:
   extracting first attributes associated with a plurality of first applications;
   collecting data samples from a plurality of wireless devices that are configured to execute one or more of the first applications, each of the data samples including (i) one or more application identifiers identifying one or more processes executing on a wireless device of the plurality of wireless devices during a time duration, and (ii) battery drain information associated with the time duration;
   determining battery usage characteristics of the extracted first attributes based on correlations among at least a portion of the data samples;
   extracting one or more second attributes associated with a second application;
   identifying one or more of the extracted first attributes that correspond respectively to the one or more extracted second attributes as one or more identified first attributes;
   using one or more of the determined battery usage characteristics that correspond respectively to the one or more identified first attributes to determine a battery usage profile for the second application;
   receiving an identifier associated with the second application from a requesting wireless device; and
   providing, based on the received identifier, the battery usage profile to the requesting wireless device.

2. The method of claim 1, wherein determining the battery usage characteristics comprises generating statistical coefficients for the extracted first attributes, and wherein the battery usage profile for the second application is based on one or more of the statistical coefficients.

3. The method of claim 1, wherein the battery usage profile includes a predicted battery drain rate.

4. A system comprising:
a storage device configured to store data samples from a plurality of wireless devices that are configured to execute one or more of a plurality of first applications, the data samples being associated with at least a portion of the one or more of the first applications, each of the data samples including (i) one or more application identifiers identifying one or more processes executing on a wireless device of the plurality of wireless devices during a time duration, and (ii) battery drain information associated with the time duration; and
a processor communicatively coupled with the storage device, configured to (i) extract first attributes associated with the plurality of first applications, (ii) determine battery usage characteristics of the first attributes based on correlations among at least a portion of the data samples, (iii) extract one or more second attributes associated with a second application, (iv) identify one or more of the first attributes that correspond respectively to the one or more second attributes as one or more identified first attributes, and (v) use one or more of the battery usage characteristics that correspond respectively to the one or more identified first attributes to determine a battery usage profile for the second application,
wherein the processor is configured to receive an identifier associated with the second application from a requesting wireless device, and provide, based on the identifier, the battery usage profile to the requesting wireless device.

5. The system of claim 4, wherein the processor is configured to generate statistical coefficients for the first attributes, and wherein the battery usage profile for the second application is based on one or more of the statistical coefficients.

6. The system of claim 4, wherein the battery usage profile includes a predicted battery drain rate.

7. A method implemented by data processing apparatus, the method comprising:
collecting data samples from a plurality of wireless devices that are configured to execute first applications that are collectively associated with first attributes, each of the data samples including (i) one or more application identifiers identifying one or more processes executing on a wireless device of the plurality of wireless devices during a time duration, and (ii) battery drain information associated with the time duration;
determining battery usage characteristics of the first attributes based on correlations among at least a portion of the data samples; and
extrapolating a battery usage profile for a second application based on one or more similarities between the second application and the first applications, the second application being associated with one or more second attributes, wherein the battery usage profile is based on one or more of the determined battery usage characteristics of the first attributes that correspond respectively to one or more of the one or more second attributes,
wherein determining the battery usage characteristics comprises generating statistical coefficients for the first attributes, wherein the battery usage profile for the second application is based on one or more of the statistical coefficients.

8. The method of claim 7, comprising:
storing the determined battery usage characteristics in a database;
identifying one or more common attributes between the second application and the first applications; and
retrieving from the database, one or more battery usage characteristics for the one or more common attributes, wherein the battery usage profile is based on the one or more retrieved battery usage characteristics.

9. The method of claim 7, wherein the battery usage profile includes a predicted battery drain rate.

10. The method of claim 7, comprising:
receiving an identifier associated with the second application from a requesting wireless device; and
providing, based on the received identifier, the battery usage profile to the requesting wireless device.

11. The method of claim 7, comprising:
determining a plurality of prediction outcomes for a plurality of battery usage prediction models, wherein the battery usage prediction models include a static model that is based on the battery usage profile;
generating a battery prediction result based on a weighting of the prediction outcomes; and
determining an estimated time to a depleted state of a battery of a wireless device based on the battery prediction result.

12. A system comprising:
a storage device configured to store data samples from a plurality of wireless devices that are configured to execute one or more of a plurality of first applications that are collectively associated with first attributes, each of the data samples including (i) one or more application identifiers identifying one or more processes executing on a wireless device of the plurality of wireless devices during a time duration, and (ii) battery drain information associated with the time duration; and
a processor communicatively coupled with the storage device, configured to (i) determine battery usage characteristics of the first attributes based on correlations among at least a portion of the data samples, and (ii) extrapolate a battery usage profile for a second application based on one or more similarities between the second application and the first applications, the second application being associated with one or more second attributes,
wherein the battery usage profile is based on one or more of the battery usage characteristics of the first attributes that correspond respectively to one or more of the one or more second attributes,
wherein the processor is configured to generate statistical coefficients for the first attributes, and wherein the battery usage profile for the second application is based on one or more of the statistical coefficients.

13. The system of claim 12, wherein the processor is configured to
store the battery usage characteristics in a database,
identify one or more common attributes between the second application and the first applications, and
retrieve from the database, one or more battery usage characteristics for the one or more common attributes, wherein the battery usage profile is based on the one or more retrieved battery usage characteristics.

14. The system of claim 12, wherein the battery usage profile includes a predicted battery drain rate.

15. The system of claim 12, wherein the processor is configured to
receive an identifier associated with the second application from a requesting wireless device, and
provide, based on the identifier, the battery usage profile to the requesting wireless device.

16. The system of claim 12, wherein the processor is configured to
- determine a plurality of prediction outcomes for a plurality of battery usage prediction models, wherein the battery usage prediction models include a static model that is based on the battery usage profile,
- generate a battery prediction result based on a weighting of the prediction outcomes, and
- determine an estimated time to a depleted state of a battery of a wireless device based on the battery prediction result.

17. The system of claim 12, comprising:
- a wireless device comprising a battery, and configured to (i) determine a plurality of prediction outcomes for a plurality of battery usage prediction models, wherein the battery usage prediction models include a static model that is based on the battery usage profile, (ii) generate a battery prediction result based on a weighting of the prediction outcomes, and (iii) determine an estimated time to a depleted state of the battery based on the battery prediction result.

18. A method implemented by data processing apparatus comprising:
- collecting data samples from a plurality of wireless devices that are configured to execute first applications that are collectively associated with first attributes, each of the data samples including (i) one or more application identifiers identifying one or more processes executing on a wireless device of the plurality of wireless devices during a time duration, and (ii) battery drain information associated with the time duration;
- determining battery usage characteristics of the first attributes based on correlations among at least a portion of the data samples; and
- determining a battery usage profile for a second application, the second application being different from the first applications, the second application being associated with second attributes, wherein determining the battery usage profile for the second application comprises: identifying common attributes that are in common between the second attributes of the second application and the first attributes of the first applications, and extrapolating the battery usage profile for the second application based on the battery usage characteristics that correspond to the common attributes.

19. The method of claim 18, comprising:
- extracting the first attributes from the first applications, wherein extracting the first attributes comprises assigning an attribute to at least one of the first applications based on a determination of whether a device resource is used by the at least one of the first applications.

20. The method of claim 18, comprising:
- extracting the first attributes from the first applications, wherein extracting the first attributes comprises assigning an attribute to at least one of the first applications based on a determination of whether a library is used by the at least one of the first applications.

21. A system comprising:
- a storage device configured to store data samples from a plurality of wireless devices that are configured to execute one or more of a plurality of first applications, the first applications being collectively associated with first attributes, the data samples being associated with at least a portion of the one or more of the first applications, each of the data samples including (i) one or more application identifiers identifying one or more processes executing on a wireless device of the plurality of wireless devices during a time duration, and (ii) battery drain information associated with the time duration; and
- a processor communicatively coupled with the storage device, configured to (i) determine battery usage characteristics of the first attributes based on correlations among at least a portion of the data samples, and (ii) determine a battery usage profile for a second application, the second application being different from the first applications, the second application being associated with second attributes,
- wherein the processor is configured to identify common attributes that are in common between the second attributes of the second application and the first attributes of the first applications, and extrapolate the battery usage profile for the second application based on the battery usage characteristics that correspond to the common attributes.

22. The system of claim 21, wherein the processor is configured to extract one or more of the first attributes by at least assigning an attribute to at least one of the first applications based on a determination of whether a device resource is used by the at least one of the first applications.

23. The system of claim 21, wherein the processor is configured to extract one or more of the first attributes by at least assigning an attribute to at least one of the first applications based on a determination of whether a library is used by the at least one of the first applications.

* * * * *